(12) United States Patent
Puchtler

(10) Patent No.: US 6,694,214 B2
(45) Date of Patent: Feb. 17, 2004

(54) METHOD AND APPARATUS FOR WEIGHT COMPENSATION IN GUIDING A MOVEMENT OF A MOVEABLE MACHINE ELEMENT

(75) Inventor: Thomas Puchtler, Adelsdorf (DE)

(73) Assignee: Siemens Aktiengesellschaft, München (DE)

(*) Notice: Subject to any disclaimer, the term of this patent is extended or adjusted under 35 U.S.C. 154(b) by 0 days.

(21) Appl. No.: 10/218,435

(22) Filed: Aug. 14, 2002

(65) Prior Publication Data
US 2003/0060935 A1 Mar. 27, 2003

(30) Foreign Application Priority Data
Aug. 14, 2001 (DE) .......................... 100 39 931

(51) Int. Cl.$^7$ .............................................. G06F 19/00
(52) U.S. Cl. ...................... 700/170; 700/193; 700/254; 318/632
(58) Field of Search ................ 700/170, 169, 700/159, 173, 174–177, 189, 193, 254, 260–261; 702/105; 318/621, 632, 568.11

(56) References Cited

U.S. PATENT DOCUMENTS

| | | | | |
|---|---|---|---|---|
| 5,710,498 A | * | 1/1998 | Yutkowitz et al. | 318/632 |
| 5,920,169 A | * | 7/1999 | Hamamura et al. | 318/561 |
| 6,060,854 A | * | 5/2000 | Yutkowitz | 318/632 |
| 6,408,225 B1 | * | 6/2002 | Ortmeier et al. | 700/254 |
| 6,566,835 B1 | * | 5/2003 | Yoshida et al. | 318/569 |
| 6,601,434 B2 | * | 8/2003 | Schaefer | 73/1.79 |
| 6,604,015 B2 | * | 8/2003 | Iriguchi et al. | 700/187 |
| 2001/0029404 A1 | * | 10/2001 | Sugiyama et al. | 700/160 |

* cited by examiner

Primary Examiner—Leo Picard
Assistant Examiner—Zoila Cabrera
(74) Attorney, Agent, or Firm—Henry M. Feiereisen

(57) ABSTRACT

For a number of different operating points in a workspace of a processing machine, the total length changes caused by a weight force are determined and entered together with the corresponding set points in a compensation table. The compensation values are used to compute control variables for set points. Values for intermediate points are interpolated from the values stored in the compensation table. This eliminates positioning errors at both the predetermined operating points and the intermediate points. Advantageously, the changes in the length can be determined from the motor force that counteracts the force acting on the corresponding actuator in a static state, based on an instantaneous nominal current value and/or actual current value of the motor.

15 Claims, 1 Drawing Sheet

METHOD AND APPARATUS FOR WEIGHT COMPENSATION IN GUIDING A MOVEMENT OF A MOVEABLE MACHINE ELEMENT

CROSS-REFERENCES TO RELATED APPLICATIONS

This application claims the priority of German Patent Application Serial No. 101 39 931.6, filed Aug. 14, 2001, the subject matter of which is incorporated herein by reference.

FIELD OF THE INVENTION

The invention relates to a method and an apparatus for weight compensation in guiding a movement of a moveable machine element in an industrial processing machine, and more particularly to a method and apparatus for weight compensation in a numerically controlled machine tool, such as a robot.

BACKGROUND OF THE INVENTION

In industrial processing machines, a machine element has to be positioned very precisely to meet today's requirements for the accuracy of, for example, the work pieces machined by a numerically controlled machine tool.

The absolute positioning and orientation accuracy of machine tools and robots is diminished in particular by the following factors:

- through thread pitch errors of linear axes having ball thread drives,
- due to sagging of guide rails, for example caused by the weight of the tool and the spindle of a machine tool,
- through twisting and lacking straightness of guide rails,
- through angular errors between the guide rails,
- because the actual geometric dimensions of components are not sufficiently known, since frequently the drawing measurements are used instead of the correct information,
- with non-Cartesian machine tools and robots, the coordinate transformation for the controls is frequently based on a simplified mathematical model in order to limit the computing time and to keep the number of geometric parameters manageable.

Established methods have been developed to compensate the causes for thread pitch errors. The twisting and angular errors can be reduced by specifying narrower tolerances. However, the technical complexity and hence also the price of the processing machine increase exponentially with the required accuracy.

However, the two error sources mentioned last is typically either accepted or an attempt is made to compensate for these errors by refining the mathematical model. This can increase the complexity of the software and may require additional computing resources.

A compensation of the forces caused by the weight of the various components on machine tools or robots would therefore be desirable.

As a result of the elasticity, the weight changes the dimension of these components. Neglecting this effect causes deviations between the set point and the actual position of the machine. In some situations, these can be greater than 50 µm.

Frequently, the positioning accuracy and under rare circumstances also the orientation accuracy in the workspace is measured by external measuring devices after the processing machine begins operation. Highly accurate external measuring devices, such as laser interferometers, are available for measuring the elastic deformation of Cartesian machine tools. These measured values are then stored in the controller in form of compensation tables. Depending on the application, these measured values are frequently inadequate due to the aforedescribed reasons.

However, this method cannot be applied at all to non-Cartesian machine tools and robots. For provide weight compensation for such machines with parallel kinematics tools, a different solution was proposed in the German Patent Application 100 33 074.6. The position-dependent length changes caused by the weight in a plurality of close kinematics chains connecting a stationary first element with a moveable second element can be compensated by distributing the weight that acts of the moved element by using a forward transformation to the corresponding kinematics chains. A corresponding compensation value is determined from the resulting length changes.

This requires a complex computation in the processing task loop. Moreover, the weight in the workspace is assumed to be constant, which is not the case in various embodiments of parallel machine tools, and also not with articulated robots. In the analytical calculation of a weight acting on the actuators participating in guiding the motion, the location of the center of gravity of all essential components should be known. The effective forces and moments for each position of the machine also have to be computed.

It would therefore be desirable to provide a method and an apparatus for automatically determining suitable compensation values in both with Cartesian and non-Cartesian machine tools.

SUMMARY OF THE INVENTION

According to one aspect of the present invention, a method is disclosed for weight compensation in guiding a movement of a moveable machine element of an industrial processing machine with a predetermined set-point for generating control input variables for at least one actuator for controlling the machine element in a predetermined workspace having the following process steps:

- automatically determining changes in a length for each actuator caused by the weight for a determined number of different points of the machine element in the workspace,
- adding an elastic change in the length of the actuator caused by a force, that acts on the respective actuator in a static state, and additional elastic changes in length, that are caused by the force at articulated joints and/or additional components of the actuator having a fixed length, to form a total change in length,
- storing the corresponding operating point and the determined corresponding total change in length in a compensation table for each actuator,
- using the determined changes in total length stored in the compensation table as compensation values when generating control input values for each actuator by
  - adding the control input values to the corresponding compensation value, if a set-point is identical to one of the predetermined operating points, or
  - adding a compensation value determined by interpolating the compensation values from the compensation table in the intervals of the respective operating points.

Advantageously, a force acting in the static state on the respective actuator can be set to be identical to the opposing force of a motor on the respective actuator. The opposing force of the motor can be determined from a respective instantaneous nominal current value and/or from an actual current value of the motor.

According to another advantageous embodiment of the method of the present invention, the opposing force of the motor can be determined from the equation $$F_a = i_s \cdot m_k \cdot \frac{2\pi}{P}$$

if the actuator is implemented as a ball screw drive, or $$F_a = i_s \cdot m_k$$

if the actuator is implemented as a linear direct drive, wherein $i_s$=instantaneous nominal current value and/or actual current value, $m_k$=motor constant in [Nm/A], and P=thread pitch of the ball screw drive of the actuator.

According to another advantageous embodiment of the method, an elastic length change of the actuator can be determined from the equation $$dk_{Aktor} = \frac{F_a \cdot k}{A \cdot E}$$

wherein k=actual length,

A=cross-sectional area, and

E=elasticity modulus of the actuator.

According to yet another advantageous embodiment, an elastic length change of the articulated joints and/or additional components having the unchanged length can be determined from the equation $$dk_0 = F_a \cdot c_0$$

wherein $c_0$=reciprocal stiffness.

Advantageously, the compensation values can be applied by adding the total length changes to the corresponding set points after an inverse transformation, i.e., after the Cartesian base coordinate system is transformed into the machine axes of the moveable machine element.

Advantageously, the workspace of the processing machine can have a cuboid form which for determining the operating points can be subdivided into a three-dimensional lattice structure, wherein the determined change in total length for each actuator is stored at each lattice point or at a subset of lattice points in a data field of the compensation table.

To compensate for set points outside the predetermined workspace, the compensation value can be selected that is associated with a point located closest to the edge of the workspace. Alternatively, the compensation value can be extrapolated from compensation values located inside the workspace. Advantageously, the compensation table is implemented as a data array.

The method of the invention can be further simplified by subdividing the positioning range of the machine element for each degree of freedom of the processing machine into equidistant segments, in particular if each dimension of the workspace can be defined by a minimum value, a maximum value and a number of equidistant segments.

Advantageously, the method of the invention can be carried out automatically when the processing machine is started, by applying the desired positions in the workspace via a corresponding parts program having positioning commands for the predetermined set points and by measuring and transferring to a machine controller the corresponding instantaneous nominal current values and/or the actual current values after the corresponding positions have been reached. The values of the total length changes are determined in the machine controller and entered together with the associated positions in the compensation table.

The method can be implemented by using a suitably programmed numeric control which can also be used for determining the compensation values.

The described process steps of the invention provide, among others, the following advantages:

no external measurement devices are required;

the effective forces can be measured directly in the actuators;

errors due to erroneous simulation of the weight distribution can be largely eliminated;

simple implementation with a numeric control CNC;

transferable to any type of machine tool with known elasticity module and stiffness;

the operators can check on the operator console the compensation values for the length changes;

determination of the values for the changes in length can be easily automated;

effects due to the actual static weight are compensated, which enhances the positioning accuracy of the machine tool or robot;

the required manufacturing tolerances of the components of the processing machine are relaxed, which can reduce manufacturing costs;

the mathematical model can be simplified, which can reduce the run-time in the controller.

The method of the invention, unlike conventional or other proposed methods, almost entirely eliminates the difficulties associated with the analytical calculation of the length changes. Modern digital electric drives offer the possibility to compute the required measurements automatically with a NC-parts program. The proposed weight compensation is therefore more easily implemented and can be used almost universally.

Further features and advantages of the present invention will be apparent from the following description of preferred embodiments and from the claims.

BRIEF DESCRIPTION OF THE DRAWINGS

The following figures depict certain illustrative embodiments of the invention in which like reference numerals refer to like elements. These depicted embodiments are to be understood as illustrative of the invention and not as limiting in any way.

DETAILED DESCRIPTION OF CERTAIN ILLUSTRATED EMBODIMENTS

Figure 1:
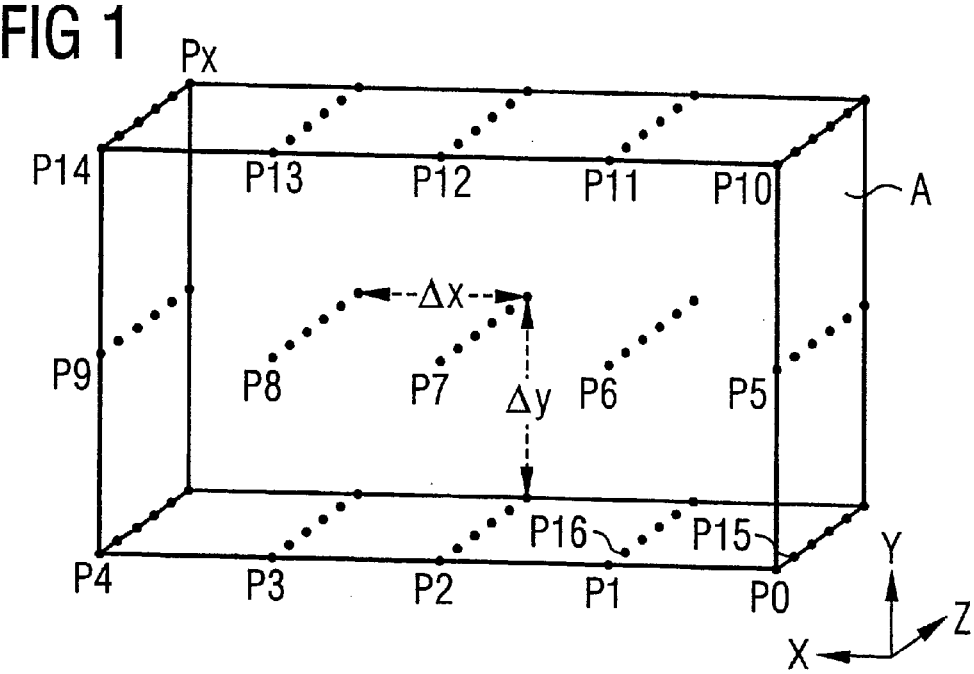
FIG. 1 shows a cuboid workspace with a positioning range subdivided into equidistant segments.
Figure 2:
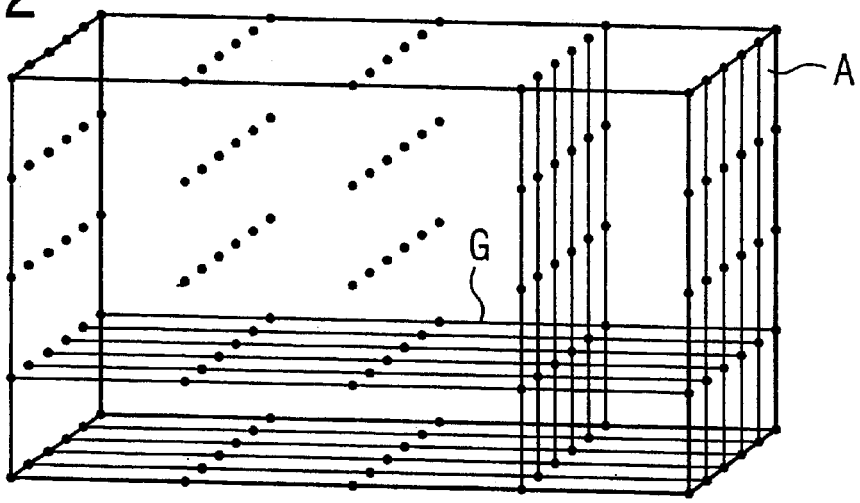
FIG. 2 shows a cuboid workspace for a machine element with a three-dimensional lattice structure.

The following discussion will focus initially on a workspace A, as shown for example in the schematic diagrams of FIGS. 1 and 2. At a number of different operating points P0, . . . , Px in the workspace A of a machine element (not shown) of a processing machine, initially compensation values K for compensating elastic length changes caused by the weight Fg are determined as described below.

According to the principle "actio=reactio", it is assumed that in the static state the force Fg acting upon an actuator that causes an elastic length change is identical to the opposing force Fa of the motor on the actuator. Applying Hooke's law:

$$\sigma = E * \epsilon \text{(Hooke's Law)},$$

wherein $\sigma$=normal stress, i.e., the force $F_a$ normal to a surface A divided by the surface area (unit [N/m$^2$]), E=elasticity modulus (unit [N/m$^2$]), and $\varepsilon = \dfrac{dk}{k}$ is the relative length change.

The normal stress $\sigma_i$ on the $i^{th}$ actuator is directly proportional to the force $F_{s,j}$ in the direction of the actuator (i). The elastic length change $d_{kAktor}$ is therefore $$dk_{Aktor} = \frac{F_a \cdot k}{A \cdot E} \qquad (1)$$

wherein k=actual length,

A=cross-sectional area, and $F_n$=axial tension or compression force on the actuator, E=elasticity modulus of the actuator.

The elastic properties of the articulated joints and other components whose length does not change, result in the additive length changes that depend on the force $$dk_0 = F_a \cdot c_0$$

in the direction of the actuators $c_0$ refers hereby to a reciprocal stiffness.

Modern digital drives typically provide the instantaneous nominal current value and actual current value $i_s$ for evaluations.

The force $F_a$ in the actor can be computed from the following equation:

$$F_a = i_s \cdot m_k \cdot \frac{2\pi}{P} \qquad (3a)$$

if the actuator is implemented as a ball screw drive, or $$F_a = i_s \cdot m_k \qquad (3b)$$

if the actuator is implemented as a linear direct drive, wherein $m_k$=motor constant in [Nm/A], and P=thread pitch of the ball screw drive of the actuator.

The total resulting change in length dk, which is also referred to as total length change, is then:

$$dk = dk_{Aktor} + dk_0 = i_s \cdot m_k \cdot \left( \frac{2\pi}{P} \left( \frac{k}{A \cdot E} + c_0 \right) \right) \qquad (4a)$$

for an actuator implemented as a ball screw drive, or $$dk = dk_{Aktor} + dk_0 = i_s \cdot m_k \cdot \left( \frac{k}{A \cdot E} + c_0 \right) \qquad (4b)$$

for an actuator implemented as a linear direct drive.

In a CNC controller of the machine tool, the length changes can hence be determined at the different points P0, . . . Px of the workspace A and stored in a compensation table.

Figure 3:
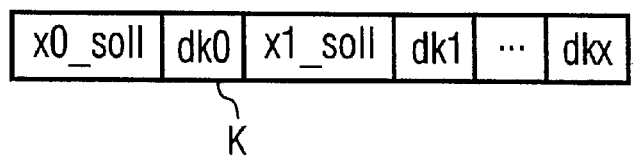
FIG. 3 shows an exemplary compensation table for compensation values stored as changes in the total length.

The set points together with the associated total length changes dk are entered into the compensating table K. An exemplary compensating table K is illustrated in FIG. 3, wherein the set-point X_soil of a position and subsequently the corresponding compensation value dk are entered for all operating points P0, . . . Px.

The control values for drives (not shown) can be generated from set-point values by correcting the corresponding set-point values with the associated compensation values and outputting the corrected values as control values for controlling the drives. This initially eliminates an existing position error on the selected operating points P0, . . . Px.

Since the majority of the possible operating points in the workspace A is typically not among these measurement values which represent only a representative selection of possible positions in the workspace A, it may be necessary to compensate potential position errors also in the regions located between the measurement points.

In these intermediate intervals, the compensation values can be interpolated from the compensation values in the compensation table K, which also reduces discrepancies. For points located outside the workspace A, the closest point at the edge of the workspace is calculated and its compensation value is used.

For example, the method can be used to automatically calculate—for example, during acceptance of a machine tool or a robot—the required measurements with the help of an NC-parts program. This can be done, for example, by moving to the desired positions in the workspace using a corresponding parts program having positioning commands for the predetermined set points and measuring, after the corresponding position is reached, for each actuator the nominal current values and/or actual current values of the motor and transferring these values for the subsequent calculations according to the computational steps (1) to (4) to the machine controller.

The so determined total length changes dk are then stored in a suitable form in the numeric controller as the compensation table K (see FIG. 3). The table can be used in the aforedescribed manner for compensating the effects of the weight, which allows a significant reduction in the deviations as well as in the technical complexity and the necessary computing time in a numeric controller.

The method can be quite effective if a regular three-dimensional lattice is placed over the cuboid workspace A. Such an arrangement is schematically shown in FIG. 2 which indicates the lattice structure G. The total length change dk is to be entered in a data field for each lattice point, i.e., the operating point P0, . . . , Px to be measured.

The actual compensation is performed preferably by adding after an inverse transformation, i.e., after the transformation from the base coordinate system into the machine axes, the respective length changes to the actual set points of the machine axes. In this way, the positioning errors caused by the elasticity of the machine elements and actuators are compensated.

The memory space required for the compensation table K can be optimized by suitably selecting the positions in the workspace A. For example, for each degree of freedom (e.g., the dimensions X, Y, Z in FIG. 1) of the machine, the positioning range is subdivided into equidistant intervals $\Delta x$, $\Delta y$ and $\Delta z$, which places the measurement points P0, ..., Px on a regular lattice. This is illustrated in FIG. 1, where the exemplary equidistant operating points are labeled as P0 to P16.

Each dimension X, Y, and Z is characterized by a minimum value, a maximum value and the number of equidistant intervals. This approach provides an additional advantage in that the interpolation of the compensation values in the intervals is very simple and not critical with respect to the runtime and the required computer resources. For points between the lattice points, the deviation is computed, for example, by a linear interpolation between the eight adjacent lattice points.

The lattice is defined by the limit values $x_{min}$, $y_{min}$, $z_{min}$, $x_{max}$, $y_{max}$, $z_{max}$ of the selected cuboid and the number $n_x$, $n_y$, $n_z$ of the equidistant intervals along each of the axes of the movable machine element.

A compensation data set hence consists of $$(n_x+1)*(n_y+1)*(n_z+1)$$

measured length changes $dk=(d_x, d_y, d_z)$. Three integer numbers are uniquely associated with each lattice point P0, ..., Px or gp according to $$gp(i,j,k) = \begin{pmatrix} x_{min} + i \cdot \frac{x_{max} - x_{min}}{n_x} \\ y_{min} + j \cdot \frac{y_{max} - y_{min}}{n_y} \\ z_{min} + k \cdot \frac{z_{max} - z_{min}}{n_z} \end{pmatrix} \quad (5)$$

A possible implementation of the method by using a suitably programmed numeric controller is described below. The technical solution can hence be implemented in software, whereby the example is based on using three actuators driving the movable machine element, e.g., a main spindle of a numerically controlled machine tool. The abbreviation CFC refers to "Cartesian Force Compensation."

The employed probe length is part of a configuration data of the CFC and is calculated during machining by using the actual length of the tool.

In the following, the required definitions, so-called GUD variables (Global User Data) are described. All data for the CFC are assumed to be channel-specific system user data SGUD. The names always start with "CC_CFC_". The coordinate axis of two-dimensional GUD's is indicated by the second index.

The CFC is activated by setting the GUD_CC_CFC_APPLY to 1. To validate changes of the CFC data, the value 4 is added to the value of CC_CFC_APPLY and a channel-specific RESET is triggered. The Compile Cycle (CC) then reads all CC_CFC_... -GUD's. At the end, the value 4 is subtracted from CC_CFC_APPLY. This message indicates to the operator that processing of the data has been successfully completed.

The following data apply to the lattice:

CC_CFC_INTERVALS[0,0]=number $n_x$ of intervals along the x-axis
CC_CFC_INTERVALS[0,1]=number $n_y$ of intervals along the y-axis
CC_CFC_INTERVALS[0,2]=number $n_z$ of intervals along the z-axis
CC_CFC_BORDERS[0,0]=minimum x coordinate of the lattice
CC_CFC_BORDERS[0,1]=minimum y coordinate of the lattice
CC_CFC_BORDERS[0,2]=minimum z coordinate of the lattice
CC_CFC_BORDERS[1,0]=maximum x coordinate of the lattice
CC_CFC_BORDERS[1,1]=maximum y coordinate of the lattice
CC_CFC_BORDERS[1,2]=maximum z coordinate of the lattice The length changes are stored in a two-dimensional field CC_CFC_VALUE. For the length change at the lattice point $gp_{ijk}$, the first index in the CC_CFC_VALUE is $$m=i+(n_x+1)\cdot j+(n_x+1)\cdot(n_y+1)\cdot k, 0 \leq i \leq n_x, 0 \leq j \leq n_y, 0 \leq k \leq n_z \quad (6).$$

The CC limits the numbers, for example, to a value 19, which provides a maximum of $20^3=8000$ lattice points.

All measured compensation values are entered, for example, as integer values in micrometers. This reduces by one half the required memory space in the static write/read memory of the CNC as compared to a floating-point format.

The following overview shows exemplary CFC GUD's which are established in a definition register. For diagnostic purposes, the compensation value effecting the actual position is indicated in the GUD CC_CFC_COMP_VAL. The length changes are stored in a two-dimensional field CC_CFC_VALUE, with positive values to be entered for tensile forces, i.e., increasing length.

| GUD | Type | Unit | Remarks |
| --- | --- | --- | --- |
| CC_CFC_APPLY | INT | — | 0 = CFC inactive |
| | | | 1 = CFC active |
| | | | 5 = GUD's set to valid by the CC after next RESET or M30/M2 |
| CC_CFC_PROBE_LENGTH | REAL | mm | Probe length |
| CC_CFC_BORDERS[2,3] | REAL | mm | Lower and upper limit of lattice |
| CC_CFC_INTERVALS[1,3] | INT | — | Number of intervals between lower and upper limit |
| | | | −1 = lattice empty |
| | | | 0 = CFC independent of the respective coordinate |
| | | | 1 ... 19 Number of intervals |

-continued

| GUD | Type | Unit | Remarks |
|---|---|---|---|
| | | | along a coordinate axis of the lattice |
| CC_CFC_VALUE[len,3] | INT | μm | The length depends on the sum of all lattice points and the reserved static memory for the GUD variables. |
| CC_CFC_COMP_VAL[3] | REAL | mm | Actual effective compensation value (read-only) |

EXAMPLE

Assume that CC_CFC_Intervals=4/2/5 This indicates that 4+1=5 times 2+1=3 times 5+1=6 compensation value determined and entered. As a result:

| | |
|---|---|
| CC_CFC_VALUE[0–4] | 5 length changes for the smallest Y and Z coordinates of the cuboid |
| CC_CFC_VALUE[5–9] | 5 length changes for the second smallest Y coordinate and the smallest Z coordinate of the cuboid |
| CC_CFC_VALUE[10–14] | 5 length changes for the largest Y coordinate and the smallest Z coordinate of the cuboid |
| CC_CFC_VALUE[15–19] | 5 length changes for the smallest Y coordinate and the second smallest Z coordinate of the cuboid |
| ... | ... |
| CC_CFC_VALUE[85–89] | 5 length changes for the largest Y and Z coordinates of the cuboid |

If this scheme is applied to the illustration of FIG. 1, then this illustration shows the first index of the field CC_CFC_VALUE for the first 17 lattice points P0 to P16.

In the following, an example of a NC-part program is provided, which can be used to determine and store the compensation values dk for the lengths based on the afore-described computational approach:
; CFCINIT addresses the lattice points and measures the actuator moments,
; calculates the actuator elongation values and stores them in the CFC-GUD variables.
DEF INT VIX, VIY, VIZ, VIN
DEF INT WERKZEUGNR=0; tool with average weight for the measurement
DEF INT SCHNEIDENNR=1
DEF INT SCHRITTWEITE[3]
DEF REAL FORCE
; conversion factor from moment and/or current into arm elongation
Def Real Forcefaktor
FORCEFAKTOR=(0.0034*0.15)
TRAORI (1)
SPOS-0
N10 FOR VIX=0 TO2
N20 IF CC_CFC_INTERVALS[0,VIX]>0
N30 SCHRITTWEITE[VIX]=(CC_CFC_BORDERS[1,VIX]-CC_CFC_BORDERS[0,VIX])/CC_CFC_INTERVALS[0, VIX]
N40 ELSE
N50 SCURITTWEITE[VIX]=0
N60 ENDIF
N70 ENDFOR
; Bei Zugriff auf $AA=Werte siehe MD36730 und MD32920
N100 MSG ("Ermittlung der CFC-Daten")
N120 IF WERKZEUGNR>0
N130 CC_CFC_PROBE_LENGTH=$MC_CC_TOOL_FLANGE[2]+$TC_DP3[WERKZEUFNR, SCHNEIDENNR]
N140 ELSE
N150 CC_CFC_PROBE_LENGTH=$MC_CC_TOOL_FLANGE[2]
N160 ENDIF
ID=101 DO $r1=$AA_CURR[AX1]$r2=$AA_CURR[AX2]
N199 VIN=0
N200 FOR VIZ=0 TO CC_CFC_INTERVALS[0,2]
N210 G1 F5000 Z=CC_CFC_BORDERS[0,2]+SCHRITTWEITE[2]*VIZ
N220 FOR VIY=0 TO CC_CPC_INTERVALS[0,1]
N230 Y=CC_CFC_BORDERS[0,1]+SCHRITTWEITE[1]*VIY
N240 FOR VIX=0TO CC_CFC_INTERVALS[0,0]
N250 X=CC_CFC_BORDERS[0,0]+SCHRITTWEITE[0]*VIX
N270 G4 F2
N260 STOPRE
N280 CC_CFC_VALUE[VIN, 0]=$AA_IM[AX1]*$AA_CURR[AX1]*FORCEFAKTOR
N290 CC_CFC_VALUE[VIN, 1]= $AA_IM[AX2]*$AA_CURR[AX2]*FORCETFAKTOR
N300 CC_CFC_VALUE[VIN, 2]=$AA_IM[AX3]*$AA_CURR[AX3]*FORCEFAKTOR
N310 VIN=VIN+1
N320 ENDFOR
N330 ENDFOR
N340 ENDFOR
N1000 M30

While the invention has been disclosed in connection with the preferred embodiments shown and described in detail, various modifications and improvements thereon will become readily apparent to those skilled in the art. Accordingly, the spirit and scope of the present invention is to be limited only by the following claims.

What is claimed is:

1. Method for weight compensation in guiding a movement of a moveable machine element of an industrial processing machine having a predetermined set-point, the method capable of generating control variables for at least one actuator for controlling the machine element in a predetermined workspace, the method comprising:
   determining at a predetermined number of different operating points of the machine element in the workspace a first elastic change in a length of an actuator caused by a weight force in a static state on the respective actuator,
   determining at the predetermined number of operating points a second elastic change in a length, caused by the weight force at articulated joints and/or at additional components of the actuator having a fixed length, adding the first and second elastic changes at the predetermined number of operating points to form changes in the total length for the actuator, storing for each actuator the corresponding operating points and the determined changes in total length in a compensation table, and generating control input values for each actuator by using as compensation values the determined changes in total length stored in the compensation table by if a set-point is identical to one of the predetermined operating points, adding the compensation value corresponding to the set-point, or if a set-point is different from the predetermined operating points, adding a compensation value determined by interpolating the compensation values in the compensation table in an interval in which the respective operating point is located.

2. Method for weight compensation according to claim 1, wherein the weight force in the static state on the actuator is set to be identical to a force of a motor acting on the respective actuator in an opposing direction.

3. Method for weight compensation according to claim 2, wherein the force of the motor is determined from at least one of a nominal current value and an actual current value of the motor.

4. Method for weight compensation according to claim 3, wherein the force of the motor is determined from the equation:

$$F_a = i_s \cdot m_k \cdot \frac{2\pi}{P}$$

if the actuator is implemented as a ball screw drive or from the equation:

$F_a = i_s \cdot m_k$ if the actuator is implemented as a linear direct drive, with
$i_s$=instantaneous nominal current value and/or actual current value,
$m_k$=motor constant in [Nm/A], and
P=thread pitch of the ball screw drive of the actuator.

5. Method for weight compensation according to claim 3, wherein the first elastic change is determined from the equation:

$$dk_{Aktor} = \frac{F_a \cdot k}{A \cdot E}$$

with
k=actual length,
A=cross-sectional area, and
E=elasticity modulus of the actuator.

6. Method for weight compensation according to claim 2, wherein the second elastic change is determined from the equation:

$dk_0 = F_a \cdot c_0$ with $c_0$=reciprocal stiffness.

7. Method for weight compensation according to claim 3, and further comprising:

moving the machine element to desired positions in the workspace via a corresponding parts program having positioning commands for the predetermined set points, measuring at least one of the corresponding nominal current values and actual current values after the desired positions have been reached, and supplying the measured current values to a machine controller, which determines the values of the changes in total length and enters the determined values together with the associated desired positions in the compensation table.

8. Method for weight compensation according to claim 1, wherein the compensation values are formed by adding the change in total length to the corresponding set-point after an inverse transformation which performs the transformation of the Cartesian base coordinate system to the machine axes of the moveable machine element.

9. Method for weight compensation according to claim 1, wherein the predetermined workspace has a cuboid form, and further comprising:

subdividing, for the purpose of determining the operating points, the predetermined workspace into a three-dimensional lattice structure which includes lattice points, and storing for each lattice point or a subset of the lattice points of each actuator the change in total length in a data field of the compensation table.

10. Method for weight compensation according to claim 9, wherein for a set-point outside the predetermined workspace, the compensation value is selected so as to be associated with a point on the edge of the workspace located closest to the set-point.

11. Method for weight compensation according to claim 1, wherein for a set-point outside the predetermined workspace, the compensation value is determined by extrapolation from compensation values located inside the workspace.

12. Method for weight compensation according to claim 1, wherein the compensation table is implemented as a data array.

13. Method for weight compensation according to claim 1, and further comprising subdividing a positioning range of the machine element into equidistant segments, the positioning range being associated with a degree of freedom of movement of the processing machine.

14. Method for weight compensation according to claim 13, wherein each dimension of the workspace is defined by a minimum value, a maximum value and a number of the equidistant segments.

15. Apparatus for weight compensation in guiding a movement of a moveable machine element of an industrial processing machine having a predetermined set-point, comprising a programmable numerical controller adapted to carry out the weight compensation and comprising:

means for determining at a predetermined number of different operating points of the machine element in the workspace a first elastic change in a length of an actuator caused by a weight force in a static state on the respective actuator, means for determining at the predetermined number of operating points a second elastic change in a length, caused by the weight force at articulated joints and/or at additional components of the actuator having a fixed length, means for adding the first and second elastic changes at the predetermined number of operating points to form changes in the total length for the actuator, means for storing for each actuator the corresponding operating points and the determined changes in total length in a compensation table, and means for generating control input values for each actuator by using as compensation values the determined changes in total length stored in the compensation table by if a set-point is identical to one of the predetermined operating points, adding the compensation value corresponding to the set-point, or if a set-point is different from the predetermined operating points, adding a compensation value determined by interpolating the compensation values in the compensation table in an interval in which the respective operating point is located.

* * * * *